United States Patent [19]

Mustacich

[11] Patent Number: 5,932,397
[45] Date of Patent: Aug. 3, 1999

[54] MULTICOLOR LITHOGRAPHY FOR CONTROL OF THREE DIMENSIONAL REFRACTIVE INDEX GRADIENT PROCESSING

[75] Inventor: Robert V. Mustacich, Santa Barbara, Calif.

[73] Assignee: RVM Scientific, Inc., Santa Barbara, Calif.

[21] Appl. No.: 08/861,577

[22] Filed: May 22, 1997

Related U.S. Application Data

[60] Provisional application No. 60/018,486, May 28, 1996.

[51] Int. Cl.[6] .................................................. G03G 15/02
[52] U.S. Cl. ......................... 430/321; 430/394; 385/132; 385/130; 385/140
[58] Field of Search .............................. 385/5, 132, 122, 385/129, 140, 130; 430/290, 321, 394

[56] References Cited

U.S. PATENT DOCUMENTS

| 4,308,337 | 12/1981 | Roach et al. | 430/394 |
|---|---|---|---|
| 4,668,607 | 5/1987 | Wojcik | 430/394 |
| 4,799,746 | 1/1989 | Wreede | 359/3 |
| 4,891,302 | 1/1990 | Gordon et al. | 430/394 |
| 4,921,321 | 5/1990 | Weidman | 385/130 |
| 4,971,895 | 11/1990 | Sullivan | 430/394 |
| 4,988,609 | 1/1991 | Hashimoto et al. | 430/394 |
| 5,006,285 | 4/1991 | Thackara et al. | 264/1.3 |
| 5,054,872 | 10/1991 | Fan et al. | 385/130 |
| 5,106,211 | 4/1992 | Chiang et al. | 385/132 |
| 5,142,605 | 8/1992 | Diemeer et al. | 385/130 |
| 5,143,577 | 9/1992 | Haas et al. | 385/132 |
| 5,157,746 | 10/1992 | Tobita et al. | 385/132 |
| 5,263,111 | 11/1993 | Nurse et al. | 385/130 |

(List continued on next page.)

OTHER PUBLICATIONS

Grum et al., "Optical Radiation Measurements" Academic Press, p. 147, 1979.

Svelto, O., "Priniciples of Lasers", Plenum Press, pp. 327–330 and 373, 1989.

Born, M. and E. Wolf, *Principles of Optics,* Sixth Edition, Pergamon Press, New York, 1980, p. 575.

Chen, M., L. Yu, L.R. Dalton, Y. Shi and W.H. Steier, "New Polymers with Large and Stable Second–Order Nonlinear Optical Effects," *Macromol,* 24:5421–5428, 1991.

Dill, F.H., W.P. Hornberger, P.S. Hauge and J.M. Shaw, "Characterization of Positive Photoresists," *IEEE Trans. Electr. Dev.,* ED–22: 445–452, 1975.

(List continued on next page.)

*Primary Examiner*—Martin Angebranndt
*Attorney, Agent, or Firm*—Rosenberg, Klein & Bilker

[57] ABSTRACT

Multicolor lithography is described in which the wavelength-dependent variation of light penetration into a photosensitive polymer is used to provide three-dimensional control of the refractive index gradients in the polymer resulting from photo-induced changes in the polymer. This invention provides the first method for three-dimensional index control compared to previous waveguide fabrication technologies which provide primarily two-dimensional control with very limited or no process variation in the third (depth) dimension. This method makes possible the simultaneous fabrication of multiple sizes of single mode buried channel waveguides in a single fabrication with low loss waveguide tapers connecting these channel waveguides. This approach provides large waveguides for efficient coupling to fibers while at the same time providing low loss waveguide taper transitions to small single mode waveguides. These small waveguides are electrically modulated with high efficiency to achieve low electro-optic drive voltages in a small, high speed integrated optic device. Graded-index waveguides for low optical propagation losses are inherent in this invention. Because buried waveguides and waveguide taper structures are optically defined through multicolor lithography, this method of this invention can be applied adaptively to fabricate channel waveguides to interconnect optical components in hybrid opto-electronic circuits and can be applied to passive materials as well as polymer materials with significant optical nonlinearities.

2 Claims, 9 Drawing Sheets

U.S. PATENT DOCUMENTS

| | | | |
|---|---|---|---|
| 5,265,185 | 11/1993 | Ashley | 385/132 |
| 5,292,620 | 3/1994 | Booth et al. | 430/290 |
| 5,322,986 | 6/1994 | Nutt | 219/121.6 |
| 5,332,690 | 7/1994 | Cho et al. | 385/130 |
| 5,402,511 | 3/1995 | Malone et al. | 385/43 |
| 5,439,782 | 8/1995 | Haemmerle et al. | 430/321 |
| 5,480,764 | 1/1996 | Gal et al. | 385/132 |
| 5,666,345 | 9/1997 | Takjahashi et al. | 369/275.1 |
| 5,696,865 | 12/1997 | Beeson et al. | 385/145 |

OTHER PUBLICATIONS

Kaminow, I.P., W.L. Mammel, and H.P. Weber, "Metal–clad Optical Waveguides: Analytical and Experimental Study," *App. Opt.* 13: 396–405, 1974.

Mustacich, R., M. Gilbert, R. Finn and C. Swann, "Analysis and fabrication of overlapping–electrode designs for poling and modulating channels in polymer thin films," *Appl. Opt.* 31:2800–2806, 1992.

Reisinger, A., "Characteristics of Optical Guided Modes in Lossy Waveguides," *Appl. Opt.* 12:1015–1025, 1973.

Sakai, J. and A.J. Marcatili, "Lossless Dielectric Tapers with Three–Dimensional Geometry," *J. Lightwave Technol.* 9:386–393, 1991.

Shi, Y., W.H. Steier, L.P. Yu, M.Chen and L.R. Dalton, "Large Induced Birefringence in an Optically Nonlinear Polyester Polymer," *Appl. Phys. Lett.* 2935–2937, 1991.

FIG.1

STEP 1
(top Δn boundary)
FIG.2A

STEP 2
(lateral Δn boundary
for defining channel)
FIG.2B

MULTICOLOR LITHOGRAPHY FOR CONTROL OF THREE DIMENSIONAL REFRACTIVE INDEX GRADIENT PROCESSING

This application claims benefit of Provisional Appln. 60/018,486, filed May 28, 1996.

FIELD OF INVENTION

This invention relates to the methods for fabricating optical waveguides in polymer materials. More particularly, this invention relates to fabrication methods which provide three-dimensional control of refractive index gradients to create channel waveguide structures. This invention also relates to methods for fabricating waveguides having low optical propagation losses in polymer materials and methods to fabricate multiple sizes of single mode buried channel waveguides in a single fabrication with low loss waveguide tapers connecting these channel waveguides. As a result, the method of this invention relates to low insertion losses and low electro-optic drive voltages as well as adaptive fabrication of channel waveguides to interconnect optical components in hybrid opto-electronic integration.

BACKGROUND OF THE INVENTION

Optical waveguides are widely used for the transmission of information in which light carries information by modulating its intensity of phase. Example optical waveguides include optical fibers and waveguides in polymer films. While fiber optics can provide optical signal transmission over significant distances, waveguides in polymer films are of special interest since these waveguides can consist of nonlinear optical (NLO) polymer materials. Waveguides consisting of NLO polymers shift the phase of the guided light in response to electrical fields applied to the polymer thin film containing the waveguides. This provides an important means for applying modulation to waveguided light and devices containing waveguides using NLO polymers form an important class of electro-optical modulators.

Electro-optic (EO) modulators containing NLO polymers possess important advantages compared to other types of modulators. Advantages include their low dielectric constants for use in high frequency devices. Since the velocity of optical waves in polymers is very near that of modulating radio frequency waves, traveling wave modulators with long interaction lengths for efficient modulation are practical. Further, the ability to spin coat polymer films for the fabrication of waveguides using standard photolithography techniques provides fabrication compatibility with the semiconductor industry for integration of polymer waveguide devices with silicon integrated circuits. Additional features of NLO polymers include the ability to design and control optical nonlinearity through chemical synthesis and the potential for low cost, quantity production of a NLO polymer.

A buried channel waveguide in an NLO polymer typically consists of upper and lower layers of a cladding material having a lower refractive index with a middle layer having a higher refractive index. For horizontal confinement of the waveguide to a channel in the middle layer, the channel must be surrounded by a lower index on each side. Materials which do not exhibit appreciable EO effects result in "passive" channel waveguides, while the NLO polymers provide channel waveguides having EO activity after the polymer materials have been specially processed in an electric field to "pole" the materials. The processing of channel waveguides of various dimensions is critically important to the development of polymeric EO modulators and integration of these modulators with fiber optic transmission lines. The theory for developing polymer waveguides is well understood and depends upon the precise fabrication and control of refractive index gradients within polymer materials. Channel waveguides in polymeric materials can be fabricated by a variety of methods including (1) reactive ion etching and electron cyclotron resonance, (2) photochemical processing, (3) spatially selective poling, and (4) etching techniques using lasers or electron beams.

Reactive ion etching is a process used for semiconductor devices in which a radio frequency discharge creates reactive oxygen atoms which react with a material to etch it away. This process does not change the refractive index of a material, but can be used to etch ridges or troughs in a material using photoresist patterning. Haas, et. al. (U.S. Pat. No. 5,143,577), Nurse and Arrington (U.S. Pat. No. 5,263,111), Cho, et. al. (U.S. Pat. No. 5,332,690), and Haemmerle, et. al. (U.S. Pat. No. 5,439,782) all present methods of polymer channel waveguide fabrication in which etched trenches are filled by the subsequent deposition of a material having a differing refractive index, the etched features thus defining channel waveguides. Since the channel waveguide boundaries have abrupt refractive index changes where differing materials meet, the resulting waveguide boundaries are "step-index" boundaries. Light scattering is a very sensitive function of local refractive index discontinuities, and for this reason the optical quality of etched channel waveguides is very sensitive to the smoothness of etched features. In particular, Haas, et. al. (U.S. Pat. No. 5,143,577) recognized the requirements for extreme smoothness of etched waveguide walls in order to minimize optical propagation losses resulting from scattering at waveguide boundaries. Many researchers have continued with efforts to further increase etching smoothness and further reduce optical losses in channel waveguides. Recent developments in etching by electron cyclotron resonance provide greater control of the etching process and have demonstrated smoother surfaces to further reduce optical waveguiding losses as illustrated in the review article by L. R. Dalton et. al. "Synthesis and Processing of Improved Organic Second-Order Nonlinear Optical Materials for Applications in Photonics," *Chem. Mater.*, Vol. 7, pp. 1075–1076, 1995.

Photochemical processing directly changes the refractive index of the material by changing either the $\pi$-electron density or nuclear density as the result of a photochemically-induced conformational change. A variety of photochemical processes are known and include trans-to-cis isomerization, ring-opening reactions, keto-enol tautomerism, and inter-conversion between twisted charge transfer states. Trans-to-cis photo-isomerization and photo-induced polymerization have both been widely used to define optical waveguides in polymers. In particular, the trans-to-cis photo-isomerization of the azobenzene-containing NLO polymers has been used to create large changes in refractive index. As an example, the publication by Chen, et. al. "New Polymers with Large and Stable Second-Order Nonlinear Optical Effects," *Macromolecules*, Vol. 24, pp. 5421–5428, 1991, shows that the trans-to-cis conformation change of the azobenzene-based disperse red 19 (DR19) -containing polymers results in a large refractive index drop of approximately 0.2. In a publication by Shi et. al. entitled "Large Photoinduced Birefringence in an Optically Nonlinear Polyester Polymer," *Appl. Phys. Lett.*, Vol. 59, pp. 2935–2937, 1991, this photoprocessing was employed with lithographic masks and standard UV exposure systems for photolithography to directly photoprocess channel waveguides in DR19-based NLO polymer films. Using a light field mask, the protected areas under the mask retain their high index to define channel waveguides relative to the exposed areas of the film which have a much lower index. The large refractive index gradients that have been produced through this processing with DR19-containing polymers, for example, are much too large for bounding the large single mode waveguides required for interfacing polymer EO devices with single mode optical fiber. Refractive index gradients need to be on the order of 0.005–0.01 for single mode operation of such large waveguides (5–10 $\mu$m mode sizes). While polymers can be synthesized to contain lower concentrations of the azobenzene dye DR19 which will provide smaller refractive index gradients following UV photoprocessing, the lowered DR19 concentration results in corresponding loss of EO response of the polymer since the DR19 provides this functionality to the NLO polymer.

Photoprocessing can be used to create polymer channel waveguides in ways other than directly changing the refractive index of a material. Ashley (U.S. Pat. No. 5,265,185) and Malone, et. al. (U.S. Pat. No. 5,402,511) use lithographic exposure of ultraviolet (UV)-sensitive polymers to effect the selective polymerization of materials such as UV-curing epoxies. The unexposed polymer can be removed following lithography of a channel waveguide pattern using a suitable solvent to leave a polymer waveguide or a trench that can be filled with a higher index polymer. This photoprocessing approach restricts the choices of polymers for waveguiding or cladding layers to UV-curing polymers.

Thackera, et. al. (U.S. Pat. No. 5,006,285) applies spatially selective poling to define channel waveguides in NLO polymer films. The molecular reorientations from poling result in an increase in the refractive index in the poling direction and a decrease in the index orthogonal to the poling direction. This poling induced birefringence causes waveguides defined by poling to only support optical modes with the same polarization as the poling field. While the same electrodes can be used for poling and electro-optic modulation, this is not generally useful because the fine electrode patterns required for defining channel waveguides are very different from traveling wave or other electrodes required for high speed electro-optic modulation. A further complication is that for maximum EO response a material must be strongly poled. This leaves no control over the magnitude of the index change. Further complications of this approach arise from the requirement for "contact" poling, i.e. poling the film through the direct contact of electrodes. The high electric fields required for poling at elevated temperatures cause a number of serious problems including electrical shorts and breakdowns due to microscopic imperfections and inhomogeneities in the films as well as the migration of ions and chemical decomposition of the electrodes. Another difficulty is the presence of significant fringing fields beyond the edges of the electrode features being poled. This broadens and extends the poling field in the polymer layers.

Similar to reactive ion etching, laser etching can rapidly remove polymer material using intense laser light in the deep ultraviolet. Chiang and Haas (U.S. Pat. No. 5,106,211) and Nutt (U.S. Pat. No. 5,322,986) apply laser etching (also termed laser ablation or laser photo ablation) to the fabrication of channel waveguides in polymers. Optical propagation losses resulting from roughness of the resulting waveguide walls are a serious concern with this technique, as with other etching approaches. Also, the local temperatures must be carefully controlled with this processing to avoid damaging the polymer or depoling the polymer in the laser etch process. This technique has been most suitable for the fabrication of large multimode (e.g., 10 $\mu$m and larger) waveguide structures.

One of the most serious shortcomings of all of the polymer waveguide fabrication processes described above is the inability to readily fabricate low optical loss devices which accommodate multiple sizes of single mode waveguides in a single device. The patents and processes described above have two-dimensional patterning capability in the plane of the film, but very limited or no processing flexibility in the depth of the film. For example, the etching processes proceed as uniformly as possible over the substrate surface to the same depth with the patterning capability being two dimensional. Previous photoprocessing, for example, has used strongly absorbed light resulting in large refractive index gradients. These exposures have been applied uniformly over the substrates with the large index changes conducted deeply into and through the polymer films.

For an EO polymer waveguiding device to have low optical coupling losses to single mode optical fibers, a large mode size of 5–10 microns is required for typical infrared communications wavelengths of 1.3–1.5 $\mu$m. A film thickness for the channel waveguide of 5–10 $\mu$m can correspondingly be used to achieve large mode sizes, but this requires small refractive index gradients ($\Delta n$) at the channel waveguide boundaries to be single mode. As a consequence of the small $\Delta n$, the guided mode extends significantly into the cladding layers. Since metals exhibit significant absorption of visible and infrared light, this requires the cladding layers to also be quite thick in order to insulate the mode from the modulator's electrodes to minimize this source of optical loss. Many researchers have succeeder in fabricating such single mode channel waveguides. Excellent, low loss coupling to optical fiber has been demonstrated as well as low loss waveguides. However, such waveguides have large modulator electrode spacings as a result of the thick NLO polymer film and the thick cladding layers. This results in poor EO modulation and the requirement for large drive voltages (e.g., 10's of volts rather than a few volts). Increasing the length of the modulator reduces the drive voltages, but this is not a practical solution for very high frequency rf applications, maintenance of low optical loss, fabrication simplicity and integration with semiconductor electronics.

Optimizing waveguide dimensions for the modulator instead of the fiber interface, very small single mode waveguides in the range of 1.5–2.0 $\mu$m can be fabricated using thin NLO polymer films. A much larger $\Delta n$ is required for a waveguide boundary, but the single mode penetration of the cladding is also small. This permits small cladding thicknesses. Small electrode spacings and low drive voltages are achieved as a result of this approach, but now there is a large mode size mismatch if such a device is to be coupled to optical fiber. This results in very large optical insertion losses which make such a device impractical.

Low loss waveguide tapers can interconnect large mode sizes for coupling to optical fibers with small modes for efficient modulators. The need for such waveguide tapers has been increasingly appreciated. Malone, et. al. (U.S. Pat. No. 5,402,511) and Haemmerle, et. al. (U.S. Pat. No. 5,439,782) describe UV photo polymerization processes in which waveguide tapers are patterned. While Malone, et. al. (U.S. Pat. No. 5,402,511) recognizes the importance of three-dimensional patterning of a waveguide taper within the polymer film, their processing is inherently two-dimensional. Either a sloped substrate or a non-uniform polymer film deposition must be used to achieve variation in the waveguide thickness. The fabrication of slopes in the substrate introduces additional processing steps which may be incompatible with other substrate processing, can introduce microscopic surface roughness resulting in increased optical propagation losses, and can increase fabrication complexity and cost. Nonuniform polymer thin film depositions are difficult to control and standardize, and are generally avoided in the design of fabrication processes. Haemmerle, et. al. (U.S. Pat. No. 5,439,782) uses thermal processing of a two dimensional taper pattern in a meltable polymer. This processing redistributes the polymer to a nonuniform thickness that varies with width to result in a tapered thickness. This approach requires meltable polymers, but the majority of NLO polymer materials developed over the last 5 years which show the greatest promise for sufficiently large, thermally stable, optical nonlinearities are polymers having high densities of strongly nonlinear chromophores (the polymer component responsible for the optical nonlinearity) and the polymers are "lattice hardened" through crosslinking as reviewed by L. R. Dalton, et. al. in "Synthesis and Processing of Improved Organic Second-Order Nonlinear Optical Materials for Applications in Photonics," *Chem. Mater.*, Vol. 7, pp. 1069–1074, 1995. As a result of this crosslinking, these polymers do not melt. Further, the increasing use of chromophores have large optical nonlinearities also results in non-meltable polymers because many of these chromophores undergo decomposition near their melting points.

The fabrication methods discussed above have been shown to address individual aspects of the requirements for small, very high frequency EO polymer devices having low optical insertion loss and low drive voltages, but it has been impractical to realize these simultaneously in a single device fabrication because of the large difference in mode sizes that are optimum for fiber coupling and for EO modulator design. This requires spatial variations in waveguide fabrication in the vertical dimension in addition to control in the plane of the films. A fabrication method which permits three-dimensional control of refractive index gradients within films is needed so that single mode channel waveguides of different sizes can be buried within NLO polymer films and connected by low loss, three dimensional waveguide tapers. This would allow large single mode waveguides to be fabricated at the device periphery for coupling to fiber optics. These waveguides would transition to very small single mode waveguides in a high efficiency EO modulator to result in an EO device having both low insertion loss and low drive voltages.

SUMMARY OF THE INVENTION

Multicolor lithography makes possible for the first time the three-dimensional control of refractive index gradients within NLO polymer films to fabricate advanced waveguide structures such as buried channel waveguides of different sizes connected by tapered waveguides. This invention offers unique potential for low optical losses by using optically defined, smooth graded-index boundaries for waveguides in place of the mechanically-created step-index walls in etched channel waveguides. This invention also offers great simplicity in fabrication to boost productivity and lower fabrication cost. Most importantly, multicolor lithography of NLO polymers can provide a unique route to achieving NLO polymer devices having low insertion losses and low drive voltages through three-dimensional waveguide structures made possible through this approach.

This invention is the first lithographic application of photochemical processing to NLO polymers to recognize that the optical wavelength of the lithographic process can be manipulated to control the resulting refractive index gradients within NLO polymer films. Previous photochemical processing of NLO polymers to fabricate waveguide structures in these materials has used the UV exposure systems commonly used with lithography equipment by the semiconductor industry. These exposure systems provided a mix of 405 nm and 365 nm light which is strongly absorbed by the azobenzene-based disperse red 19 (DR19) NLO polymers which are representative of an important class of photo-reactive NLO polymers. The strong absorption of the UV light causes large changes in the refractive index of these polymers. A microscopic analysis of this photoprocessing shows that large index gradients are formed because of the strong attenuation of the exposure source in the polymer and that these gradients move through the NLO polymer film as the photochemical processing occurs. This invention is the first to recognize that changing the optical wavelength of the photochemical exposure source will control the size of these refractive index gradients and that the exposures can manipulated to provide three-dimensional control of the refractive index gradients created within NLO polymer films.

By adding this third dimension to the lithographic processing of photoreactive materials to create channel waveguides, more complex waveguide structures can be fabricated which address important needs in EO modulator design. These have been impractical or impossible using previous fabrication approaches. One of the most important needs is for the ability to fabricate multiple sizes of single mode channel waveguides in a single fabrication with low loss waveguide tapers connecting these channel waveguides. This is possible through the ability of this invention to spatially vary the refractive index gradients which determine mode support and define channel waveguides of different sizes at different depths in the NLO polymer material. This capability addresses an important need for large single mode waveguides in an EO modulator device which provide low optical coupling losses to single mode optical fibers while the EO modulator itself can have a very small mode size positioned between closely spaced modulator electrodes to minimize the drive voltages required for the device. The ability to fabricate and integrate both sizes of channel waveguides in a single fabrication using this invention makes possible small, very high frequency and bandwidth EO modulators which have both low optical insertion losses and small drive voltages.

This invention also takes advantage of the smooth, graded-index nature of photoprocessed refractive index gradients to fabricate channel waveguides having small optical propagation losses. Refractive index gradients formed by attenuation of the exposure source in the vertical dimension are microscopically smooth owing to the uniformity of the material and the precise exponential decay of the light intensity in a homogeneous absorbing material. Gradients defined by optical lithography in the lateral dimensions of the polymer surface are smooth as a result of the diffractive properties of light in the proximity of the lithographic mask edges. The light intensity behind these edges follows a smooth function on the order of the wavelength of light in going from light field to dark field regions behind the mask. When used as channel waveguide boundaries, these graded index profiles greatly reduce light scattering because of their microscopic homogeneity of index and the small values of Δn in these gradients. Such graded-index type refractive index gradients provide the potential for very low loss waveguides in comparison to fabrication technologies which etch channel waveguides and have microscopically large step-index material boundaries.

This invention also offers the potential for greatly reduced fabrication costs. The all-optical processing of the channel waveguide structures within the NLO polymers eliminates many expensive and complex fabrication steps involving the currently used etching processes. This processing also has the flexibility to be used "adaptively" to position and create buried channel waveguides exactly where required on a substrate to interconnect less flexible electronic, fiber or other components in hybrid opto-electronic device integrations.

DETAILED DESCRIPTION OF THE INVENTION

The present invention creates refractive index gradients within polymer films and controls the magnitude of these gradients as well as their spatial distributions within the films through manipulation of the optical wavelength used to fabricate these gradients. A number of different photochemical reactions can be used to change the refractive index of a polymeric material to create such gradients as a result of light exposure. Photochemical reactions proceed as a function of light intensity, time and concentration of the photoreactive chemical species. This invention is the first photochemical-based fabrication method for waveguide structures to recognize that the spatial intensities of light within a thin film can be manipulated through optical wavelength to determine and control the resulting refractive index gradients created by photo-induced chemical reactions. This photoprocessing can be exploited to fabricate three-dimensional refractive index gradients within thin films to define optical waveguides buried below the film surface as well as tapers and waveguide structures having special refractive index gradients and transitions.

The development of a buried channel waveguide in an NLO polymer by this invention depends upon the fact that the penetration of the optical radiation into the sample will depend upon the radiation wavelength. Explicitly, the time-dependent spatial concentrations of reacted and unreacted species in an NLO polymer film can be described to a good approximation by the following coupled equations published by Dill et. al. "Characterization of Positive Photoresist," *IEEE Trans. Electr. Dev.*, Vol. ED-22, 445–452, 1975, to model the reaction kinetics of photoresists used in lithographic processes by the semiconductor industry:

$$\partial I(x,t)/\partial x = -I(x,t)[a_{reacted}C_{reacted}(x,t) + a_{unreacted}C_{unreacted}(x,t) + a_{poly}C_{poly}(x,t)] \quad (1)$$

$$-\partial C_{reacted}(x,t)/\partial t = \partial C_{unreacted}(x,t)/\partial t = -\alpha C_{unreacted}(x,t)I(x,t) \quad (2)$$

where $I(x,t)$ is the depth- and time-dependent light intensity, the a's are molar absorptions for the reacted and unreacted forms of the NLO chromophore and other absorption by the polymer, the C's are depth- and time-dependent concentrations, and $\alpha$ is the photoconversion rate per unit intensity. With photoresists, these equations are used to calculate the spatial concentrations of reacted dissolution inhibitor which allows the photoresist to dissolve in a developing solution. These same equations applied to an NLO polymer with photoreactive properties provide the concentration gradients of photo-reactive polymer components following light exposure.

Figure 1:
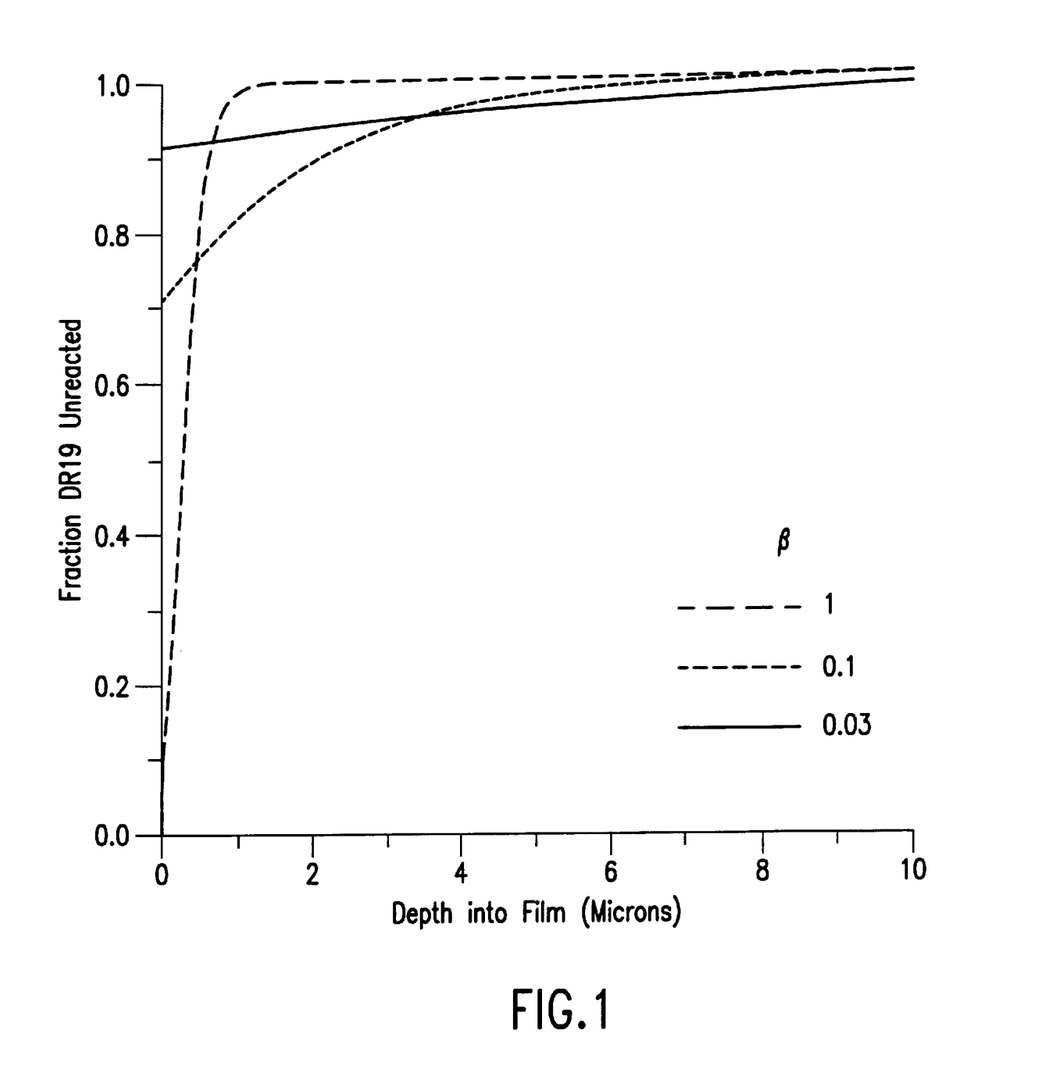
FIG. 1 is an illustration of the photoprocessing of a representative DR19-based NLO polymer as a function of optical wavelength.

These equations provide a very good description of the UV photochemical properties of NLO polymers containing the DR19 chromophore, for example. Using data published by Chen et. al. "New Polymers with Large and Stable Second-Order Nonlinear Optical Effects," *Macromolecules*, Vol. 24, pp. 5421–5428, 1991, for the ultraviolet photochemical kinetics and properties of bulk thin film polymers containing DR19, representative data for the light transmission as a function of depth into the NLO polymer film can be determined as shown in FIG. 1. $\beta$ is the effective absorption coefficient; $\beta$ is normalized to the optical density of the absorption maximum near 475 nm (i.e., $\beta=1$ at 475 nm and $\beta<1$ at visible wavelengths greater than 475 nm). The concentration profiles of unreacted DR19 chromophores for values of $\beta$ of 1, 0.1 and 0.03 are plotted in FIG. 1. At lower $\beta$ values, light is less attenuated and the resulting photochemical reactions have gradients which follow the more penetrating profile of the light in the film. For example, the NLO polymers containing large DR19 concentrations typically have a transmission of approximately 10% at 475 nm through a film thickness of approximately 800 nm. This results in a steep gradient of light intensity within the film as illustrated by the $\beta=1$ curve in FIG. 1. In this case, the photoprocessing results in a steep refractive index gradient near the surface because of the strong absorption of the light by the photoreactive DR19 in the NLO polymer. Continued exposure results in the migration of this steep gradient deeper into the film. Eventually, this gradient will travel all the way through the film resulting in a large index change throughout the exposed film. The photobleaching of waveguides in the DR19-containing NLO polymers published by Shi et. al. "Large Photoinduced Birefringence in an Optically Nonlinear Polyester Polymer," *Appl. Phys. Lett.*, Vol. 59, pp. 2935–2937, 1991, used strongly absorbed UV irradiation to fully bleach exposed polymer films in this manner.

The effects of changing the photoprocessing wavelength within the absorption spectrum of a photoreactive chemical specie are shown in FIG. 1 for the curves β=0.1 and β=0.03. In these cases, the photoprocessing exposure is now performed at wavelengths away from the absorption maximum (β=1) and the light penetrates more deeply into the film as a result of the reduced absorption. The profile of the light intensity as a function of time is given by equation 1. The photobleaching of the DR19 specie in the NLO polymer films then results in spatial concentration gradients which follow the more penetrating spatial distribution of the light intensity for these lower β examples. Since the refractive index in the films follows the local concentration of the DR19, the photoprocessing at different wavelengths described by this invention results then in the ability to create and control refractive index gradients within films. This is especially important for the fabrication of large waveguides in which very small refractive index gradients are required (e.g., Δn<0.01) for single mode operation. All previous approaches to the photoprocessing of waveguides result in large Δn gradients as illustrated by the β=1 case in FIG. 1. This approach results in large index changes of approximately 0.25–0.3 in the DR19 NLO polymers. Waveguides having boundaries defined by such large index differences are multimode waveguides unless the waveguide dimensions are very small (e.g., approx. 1.5–2 μm dimensions for waveguiding at a wavelength of 1300 nm).

Figure 2A:
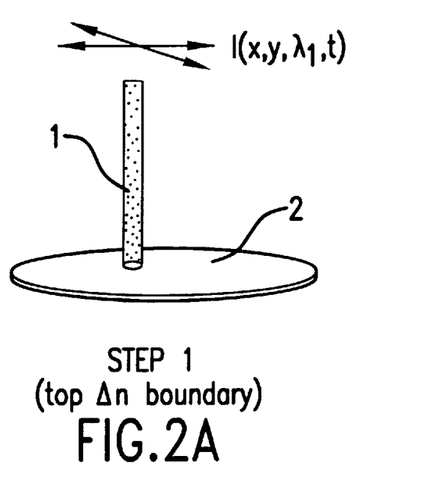
FIGS. 2A, 2B and 2C are illustrations of a two-step multicolor lithographic process for fabricating a buried channel waveguide in an NLO polymer film.
Figure 2B:
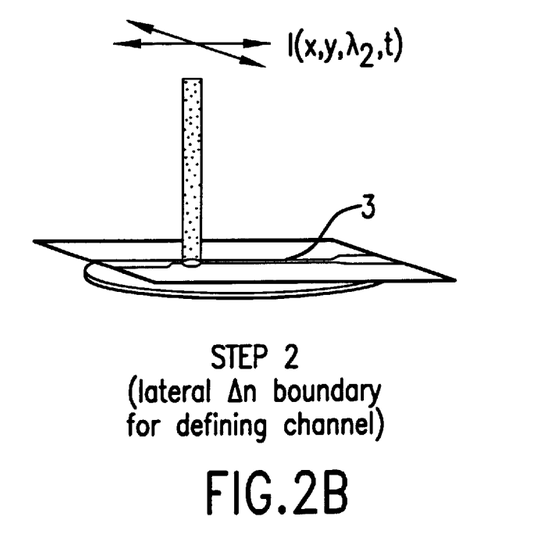
Figure 2C:
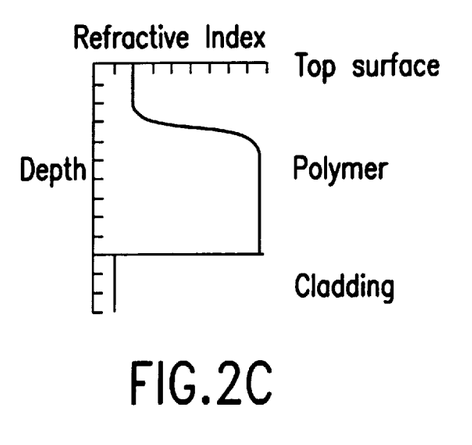

An illustration of an example multicolor lithographic process requiring two exposure steps is shown in FIGS. 2A, 2B and 2C. This example process begins in FIG. 2A with an NLO polymer film 2 which is deposited on a cladding layer on a substrate. The first exposure step involves the use of a beam 1 of a strongly absorbing wavelength to photoprocess the top surface of an NLO polymer film on a substrate to create an upper region of lower index. This lower index region resulting from this first exposure provides an upper Δn boundary for a waveguide within the film. This first step makes the physical deposition of an upper waveguide "cladding" (low index) layer unnecessary as the photoprocessed upper region functions effectively as a cladding layer. The plot shown in FIG. 2C shows the refractive index profile within the NLO polymer film as a function of depth. Following this first exposure step, the higher index region of the NLO polymer film beyond the penetration of the optical wavelength used in this first step is bounded above and below by regions of lower refractive index. This creates a planar waveguide in the higher index region of the NLO polymer film. To define a channel waveguide, a second exposure at a different wavelength is used in the second step with a lithographic mask 3, as shown in FIG. 2B. In this example, a light field mask is used for patterning the channel waveguide. The features on the mask (consisting of a thin lines in this example) block the light to protect the region beneath the mask features to keep the refractive index large and replicate the pattern of the mask. In the light field (transmitting) regions of the mask on either side of the feature, a penetrating, highly transmissive wavelength of light is used to photoprocess a small index gradient in the film similar to the examples shown in FIG. 1 for β=0.03. This second exposure process results in small Δn gradients in the lateral direction required to define a single mode channel waveguide within the NLO polymer film. Additional exposures without the mask can be used to further shape the Δn profiles between clear field and dark field mask features.

The process shown in FIG. 2 has many important features which contrast it with previous methods of channel waveguide fabrication. First, it is the only known fabrication process in which refractive index gradients can be created and their magnitudes controlled optically. This invention enables a whole new class of three dimensional refractive index patterns and waveguide structures to be fabricated in NLO polymers. Further, it is an all optical process involving a minimum number of fabrication steps. This can have a large impact on fabrication cost and optical quality of the waveguides. The photoprocessing steps for fabricating waveguides in NLO polymers are contrasted with the steps for conventional fabrication using dielectric etching in Table 1. The optical only processing involves few steps and low cost equipment. By contrast, while photoresist processing in the etching approach requires similar cost equipment, the plasma etching adds additional cost, and the added process steps further add to the fabrication cost and complexity.

Optical quality of channel waveguides in NLO polymer films is very sensitive to the processing. In the case of dielectric etching, the wall roughness must be carefully controlled to minimize optical losses. While ion cyclotron etching has improved wall smoothness, the optical only process results in inherently smooth waveguide boundaries owing to the diffractive properties of light at the edges of mask features. Directly beneath the shadow edge of the mask feature, the electric field of the incident light falls to 50%. The edge of the mask feature basically propagates a cylindrical electromagnetic wave which interferes with the incident plane wave to result in the decaying standing wave, the field gradient beneath the edge, and the decaying field underneath the mask feature as discussed by Born and Wolf, *Principles of Optics*, Sixth Edition, Pergamon Press, New York, 1980, p. 575. The squaring of the field to calculate the exposure intensity results in a gradient which falls to 25% directly beneath the mask edge. The gradient depends upon wavelength and distance and is a smooth function on the scale of the wavelength of light.

TABLE 1

Comparison of the number of waveguide processing steps required for multicolor lithography with conventional etching processing.
NLO WAVEGUIDE PROCESSING STEPS

| MULTICOLOR LITHOGRAPHY | ETCH PROCESSING |
| --- | --- |
| spin coat bottom cladding | spin coat bottom cladding |
| spin coat NLO polymer | spin coat photoresist |
| first exposure ($\lambda_1$) | soft bake |
| second exposure ($\lambda_2$, mask) | expose photoresist (UV, mask) |
| | wet process photoresist |
| | plasma etch |
| | strip photoresist |
| | spin coat NLO polymer |
| | spin coat top cladding layer |

With regard to the refractive index gradients in the film created by strongly absorbed light such as exposure step 1 in FIG. 2 to create a top cladding layer, these refractive index gradients are smooth owing to the exponential attenuation of the light in the polymer film. The resulting refractive index gradients are a smooth graded-index type for low optical loss.

The best known examples of very low optical propagation loss waveguides are based on the use of graded index rather than step index waveguides. Familiar examples are single mode optical fiber and in-diffused waveguides in crystalline materials such as lithium niobate. Both of these examples have graded-index waveguides in which the Δn boundaries of the waveguides are smooth gradients created by the diffusion of dopants. The ability to optically fabricate small Δn graded index boundaries for channel waveguides in NLO polymer films through this invention introduces the potential to realize similarly low optical waveguide propagation losses in polymer-based opto-electronic devices. Refractive index gradients formed by multicolor lithography of NLO polymers have similar microscopic homogeneity and should provide minimal additional loss due to light scattering in waveguides. Such a low loss waveguide fabrication technology is a key requirement for practical application of NLO polymers to waveguided electro-optic devices.

Figure 3:
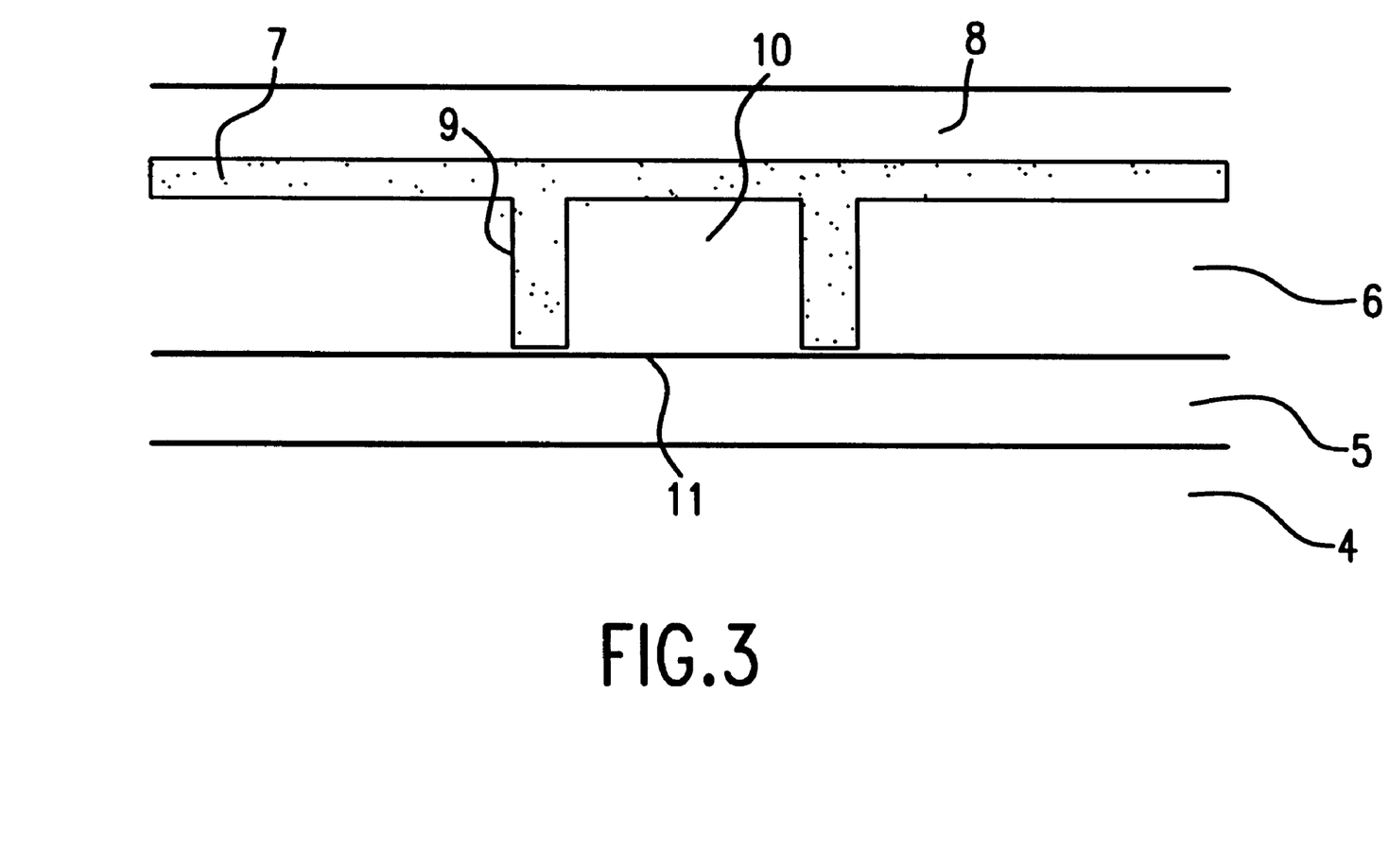
FIG. 3 illustrates a cross section of a buried channel waveguide showing graded index boundaries resulting from the photoprocessing.

FIG. 3 shows a cross section of a waveguide fabrication by the multicolor lithography described in FIGS. 2A and 2B. In this illustration, an NLO polymer film layer 6 is shown deposited on a cladding film 5 on a substrate 4. The horizontal gray zone 7 is the graded index gradient resulting from the first exposure using a strongly absorbing wavelength. This effectively creates the top cladding 8. The second exposure with the high transmission wavelength results in the vertical index gradients 9 of small Δn which laterally define the channel waveguide 10. The only mechanically defined waveguide boundary is the bottom boundary of the waveguide 11 at the interface of the cladding and polymer film depositions. Since the cladding film deposition is typically an early step in the processing, this film can normally achieve extremely low roughness. It should be point out, however, that for some cases such as waveguide structures on a transparent substrate such as glass or glass coated with indium tin oxide, the photoprocessing can also be applied from the underside to provide graded index boundaries on all sides of the waveguide. This may especially offer advantages in processing low loss passive waveguides in "passive" (non electro-optical) materials.

In addition to simplified, lower cost processing and reduced optical waveguide losses, the multicolor lithography process importantly provides the capability to spatially vary the Δn gradients within a single film to "sculpt" waveguides of different sizes while keeping them single mode through control of the magnitude of Δn. This enables the direct optical fabrication of advanced waveguide structures such as low loss waveguide tapers required to transition between waveguides of different sizes. This is an especially important problem for achieving low optical loss interfaces between single mode fibers and NLO polymer modulators having small electrode spacings for maximum EO response. Since the mode sizes of single mode fiber greatly exceed the small waveguide sizes optimum for high EO response, the polymer waveguides must be made large to match the fiber mode sizes and avoid large optical coupling losses due to size mismatch. This has been a difficult, long standing problem which existing waveguide fabrication technologies have not been able to address. This invention's capability to provide three-dimensional control of refractive index gradients within films permits the fabrication of tapers in the vertical (depth) dimensions as well as in the x-y plane standard to lithographic processes. Further, the ability to tailor cladding layers from the NLO polymer can alleviate fabrication difficulties where custom claddings are needed in order to provide mode control as well as electrical conduction which matches that of the NLO core layer for avoiding cladding interference with poling.

Previous photoprocessing research with NLO polymers has been done with UV photomask aligners using standard, high pressure mercury arc lamps for light sources as described by Chen et al. in "New Polymers with Large and Stable Second-Order Nonlinear Optical Effects," *Macromol.* 24: 5421–5428, 1991. Typical photoresist exposure systems used in this early work provide 10's of mW/cm$^2$ output in a uniform field over the surface of a wafer. The band at 405 nm comprises approximately ⅔ of the spectral output intensity, and the remaining third comes from the band at 365 nm. While 405 nm is in the "valley" of the UV-visible absorption spectrum between the strong UV absorption and the visible absorption, the significant presence of the strongly absorbed 365 nm light results in photoprocessing limited to the creation of large Δn gradients as typified by the β=1 curve shown in FIG. 1. It is important to point out, however, that exposure sources such as UV sources used. In standard lithography of photoresists by the semiconductor industry can provide good exposure sources for the first step of the process shown in FIG. 2. In this step, a large area exposure from a source with good uniformity can provide a simpler first step than scanning a laser beam or other smaller source over the NLO polymer surface to be exposed.

To achieve the multicolor lithographic/photoprocessing described in this invention, it is necessary to use highly transmissive optical wavelengths (e.g., low β values as shown in FIG. 1). These are very different from the strongly absorbing ultraviolet light which has been previously used for photoprocessing of NLO polymer materials. Using a polyurethane-based DR19-containing NLO polymer used in FIG. 1, photoprocessing can be demonstrated well into the red edge of the visible absorption band. Using lasers at different optical wavelengths, the photoprocessing of the NLO polymers can be analyzed using Dill's model for the reaction kinetics for positive photoresist (equations 1 and 2). The kinetics can be analyzed with respect to the photoresist response model by rearranging the kinetics equations to the following forms:

$$A = (1/d) ln[T(\infty)/T(0)] \tag{3}$$

$$B = -(1/d) ln\, T(\infty) \tag{4}$$

$$C = \frac{A+B}{AI_0 T(0)[1-T(0)]} \frac{dT(0)}{dt} \tag{5}$$

where $$A = (a_{unreacted} - a_{reacted})C_{unreacted}(0) \tag{6}$$

$$B = a_{poly}C_{poly}(0) + a_{reacted}C_{reacted}(0) \tag{7}$$

and C, the fractional decay rate, is defined as earlier. A and B have the units of $\mu m^{-1}$ and C has units of $cm^2/mJ$.

The kinetics model parameters for some representative laser wavelengths are listed in Table 2. While the values of A and B follow the absorption spectra, the photoprocessing rate, C, falls very rapidly with increasing wavelength. While the decrease in rates is very rapid at longer wavelengths, the rates are still sufficiently rapid to allow sizable refractive index gradient fabrications in NLO polymers through the use of laser illumination. Standard commercial dye lasers typically deliver 0.5 W or more of power using a 5–6 W argon ion laser as a pumping source. Such systems have approximately the same cost as a UV mask aligner. By focusing the beams down to beam sizes of approximately 0.1–1 mm, photoprocessing of NLO polymer films is calculated to require on the order of minutes to 10's of minutes at deeply penetrating wavelengths approaching 600 nm. This is well matched to typical rhodamine 6G dye laser outputs which reach maximum output at wavelengths >585 nm.

TABLE 2

Photoprocessing kinetics parameters.
PHOTOPROCESSING KINETICS PARAMETERS

| Wavelength | A ($\mu m^{-1}$) | B ($\mu m^{-1}$) | C ($cm^2/mJ$) |
|---|---|---|---|
| 488 | 2.94 | 2.94 | $6.4 \times 10^{-3}$ |
| 514.5 | 2.54 | 2.54 | $1.8 \times 10^{-3}$ |
| 532 | 2.02 | 2.02 | $4.0 \times 10^{-4}$ |
| 570 | 0.65 | 0.65 | $2.9 \times 10^{-6}$ |
| 405 + 365 | 5.5 | 5.5 | $6.7 \times 10^{-3}$ |

Two important implications of the slow photoprocessing rates at deeply penetrating wavelengths are the inherent control of the processing and waveguide insensitivity to near infrared light. Good process control for the precision exposure of waveguide features and 3-D structures is inherent because of the relatively low sensitivity of the photoprocessing at these wavelengths. Fabrication processes are more precisely controlled when the timing requirements are in seconds or minutes rather than microseconds to milliseconds. This provides integrated exposure control and also allows multiple exposures at different wavelengths and spatial positions to be used to "smooth" the resulting refractive index gradients within the films. Secondly, this relative insensitivity suggests that low level exposure of films to ambient light and much higher levels of waveguided infrared light will not adversely impact the films. Together, these results indicate that photoprocessing will provide good process control along with the inherent advantages of all optical processing which includes low fabrication cost, high film quality, ease of advanced waveguide structure fabrication, and graded index waveguides having low optical losses.

EXAMPLE 1

While the 570 nm light included in Table 2 significantly penetrates the DR19 polymer films, photoprocessing at a slightly longer wavelength of approximately 590 nm will provide a more ideal penetration for creating $\Delta n$ gradients for large single mode waveguides. A photoprocessing rate of $1 \times 10^{-6}$ $cm^2/mJ$ is estimated for photoprocessing at 590 nm. The low value of the photoprocessing rate can easily be compensated by the use of the higher available dye laser powers at wavelengths >585 nm using standard dyes such as rhodamine 6G.

Figure 4:
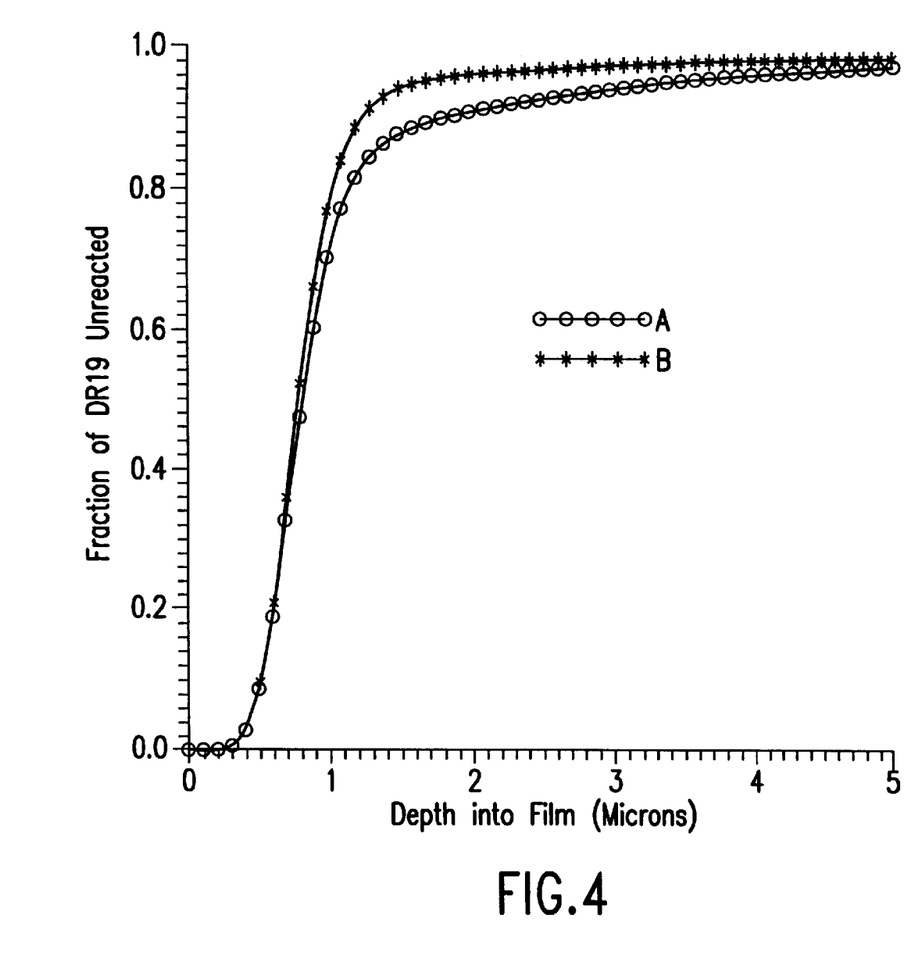
FIG. 4 shows the resulting refractive index profiles for example processing of a DR19-based NLO polymer at optical wavelengths of 514.5 nm and 590 nm.

The small $\Delta n$ gradients that can be photoprocessed at 590 nm are shown in FIG. 4. These $\Delta n$ gradients are the result of three different exposure combinations of 514.5 nm and 590 nm light. The 514.5 nm exposure creates the large $\Delta n$ gradient below the top surface of the film. This effectively provides a cladding layer. Scattering from the waveguide boundary with this cladding is small owing to the graded index nature of this boundary. The other two curves show the $\Delta n$ gradients that result from subsequent exposures at 590 nm.

In applying a single lithographic exposure step to define a buried channel waveguide as shown earlier in FIGS. 2A and 2B, the 514.5 nm exposure plus the short 590 nm exposure shown in curve A of FIG. 4 can be applied to the NLO film as the first step. In the second step, a light field mask is introduced and additional 590 nm exposure is made to result in the total exposure shown in curve B in FIG. 4. The difference between the exposure curves A and B in FIG. 4 determines the lateral $\Delta n$ gradient into the depth of the NLO film which define the buried channel waveguide. The shorter 590 nm exposure shown in curve A of FIG. 4 serves to "round" the profile and provide a more uniform front-to-back $\Delta n$ gradient difference between the masked (channel) and unmasked exposure regions.

Figure 5:
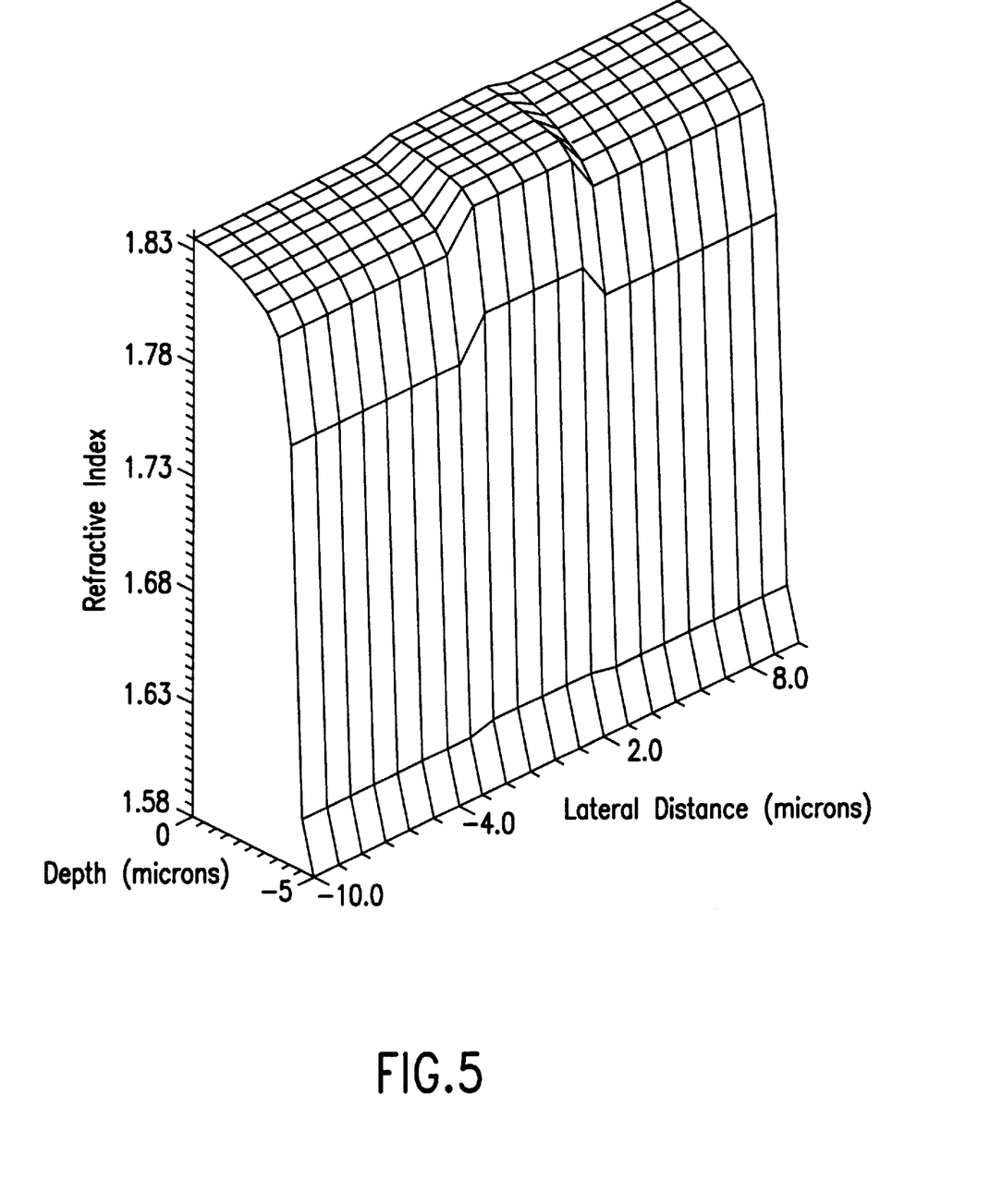
FIG. 5 shows a surface plot of the refractive index profile in the cross-section of a buried channel waveguide fabricated with two-step lithographic processing using the combination exposures from FIG. 4.

An example of the resulting refractive index profile in the film is shown in FIG. 5. This surface plot shows the refractive index in a cross section of the film. The single mode waveguiding region is the high index region protected by the mask toward the back of the film. The sharp drop in index created by the shorter wavelength exposure creates an effective cladding layer at the top surface of the NLO film and buries the waveguide below the film surface. Buried waveguides typically have smaller $\Delta n$ gradients, and in this case the optically defined gradients are qualitatively similar to the graded index gradients of low loss waveguides defined through diffusion processes in materials such as lithium niobate.

Using standard dye lasers, this processing can be performed quickly and easily using dye lasers focused to spot sizes of 1 $mm^2$ or less, yet slowly enough that fine processing control can be applied to the fabrication. Since dye lasers are tunable, a range of wavelengths can easily be applied to the processing along with optical manipulations (angle of incidence, depth of focus, etc.) to further smooth the photoprocessed refractive index gradients to achieve very low loss waveguides. Either the pump wavelengths of the argon ion laser used for the dye laser or exposure from a standard mask aligner can be used for creating the large index gradients in the NLO film surfaces.

EXAMPLE 2

The fabrication of three-dimensional waveguide structures such as single mode waveguide tapers is made possible by this invention since it provides control of refractive index gradients in the vertical as well as lateral dimensions. Previous lithography technologies only provided two-dimensional control which is inadequate for waveguide taper processing in which the vertical dimension needs to be spatially controlled and varied as well. By moving either the sample or the laser beam with computerized control of position and integrated exposure, tapers of any desired exposure profile can be created. Both movement approaches are well developed for laser milling, laser etching and laser scanning applications.

Figure 6:
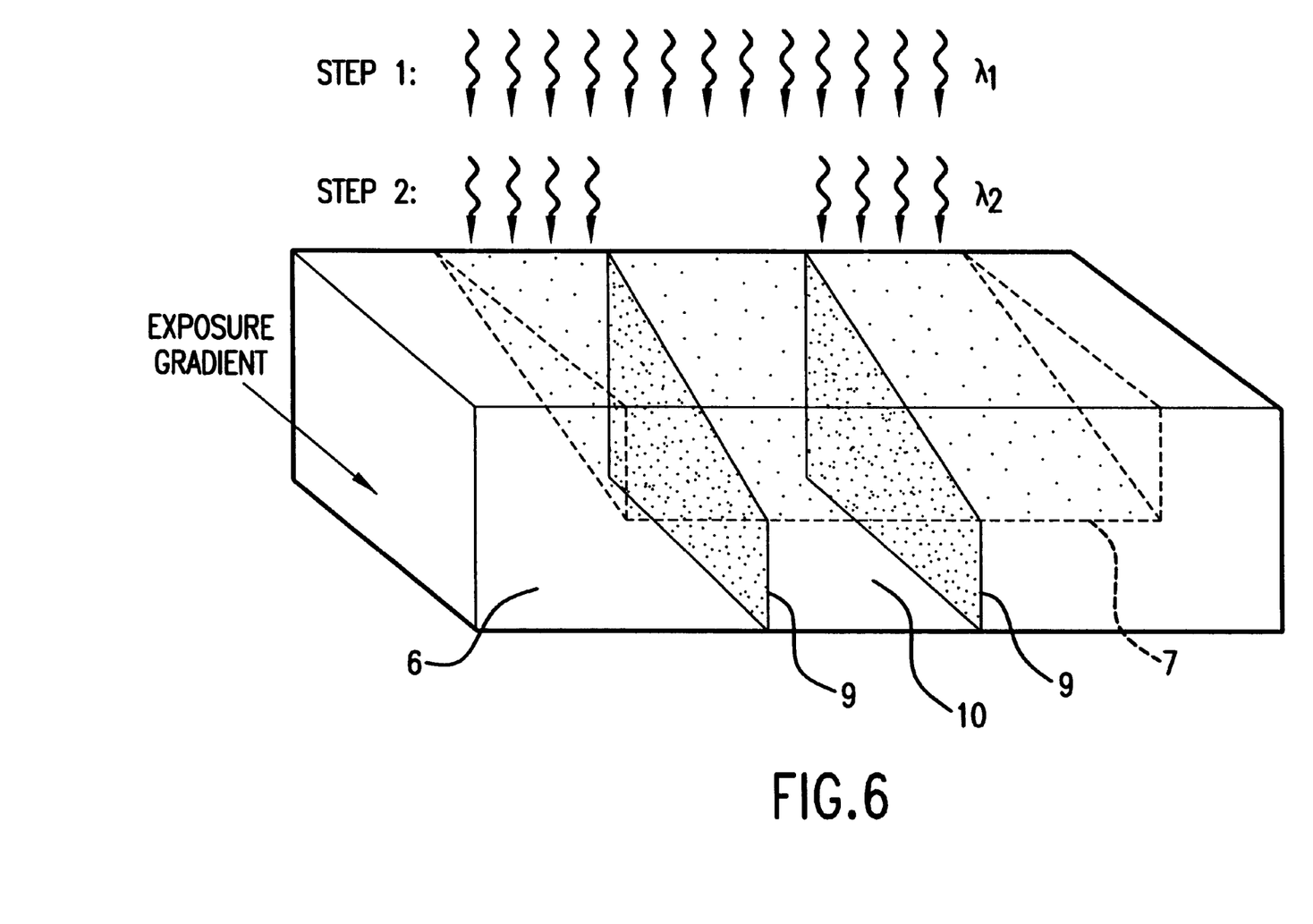
FIG. 6 illustrates the two-step multicolor lithography process for fabricating a vertical taper in an NLO polymer.
Figure 7:
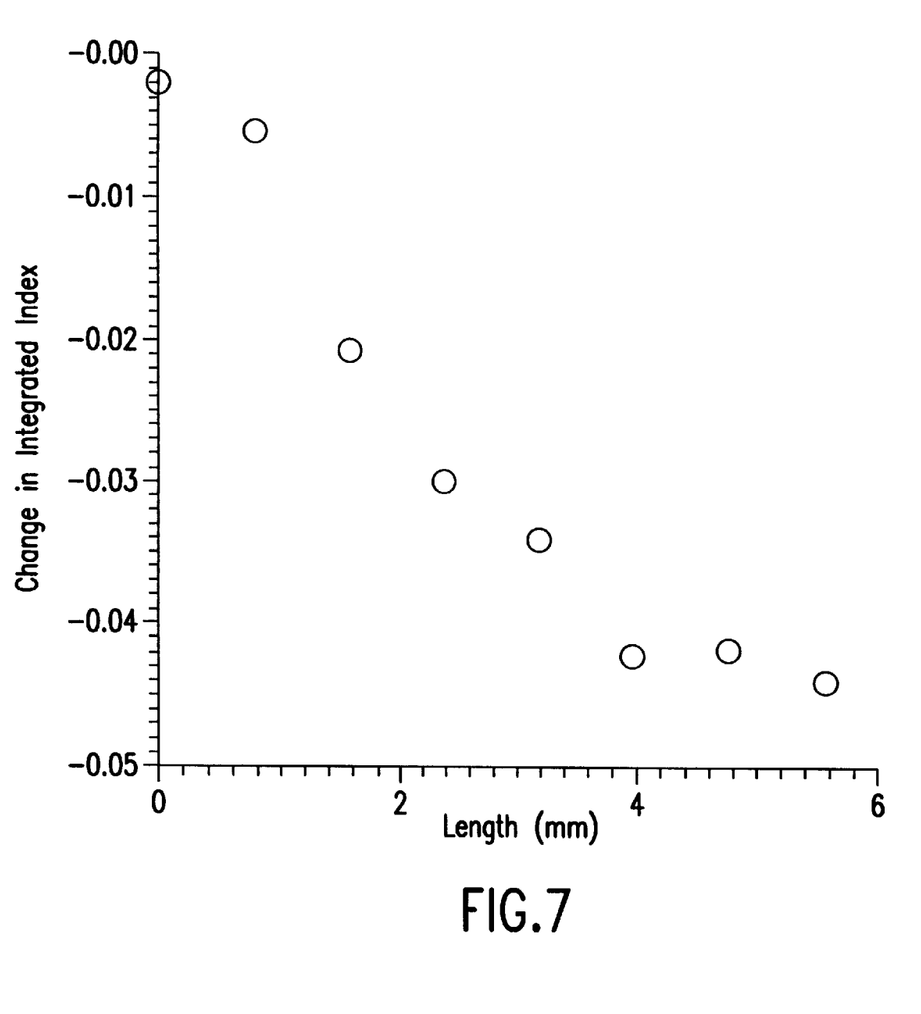
FIG. 7 shows a gradient in refractive index in a DR19-based NLO polymer made using an exposure gradient of 532 nm light.

FIG. 6 illustrates the two-step all-optical process for fabricating a vertical taper in an NLO polymer. In the first step, an exposure gradient using a short wavelength creates a broad (relative to the channel width) vertical taper of refractive index 7 within the polymer film 6. An example of an exposure for such a taper is shown in FIG. 7 using the DR19-based NLO polymer from FIG. 1 with an exposure gradient of 532 nm light. The absorbance of the film at 475 nm spatially follows the taper of the refractive index boundary processed in the thin film. In the second step shown in FIG. 6, a light field mask of the channel is lithographed using a more penetrating wavelength over the taper to create the small lateral $\Delta n$ boundaries 9 which define a buried channel 10 in the taper. Importantly, an exposure gradient can also be applied to the long wavelength exposures so that the lateral refractive index gradients can be smoothly varied to maintain the desired mode support of the guided mode in the channel. This is easily accommodated through control of the integrated exposure profile.

Figure 8:
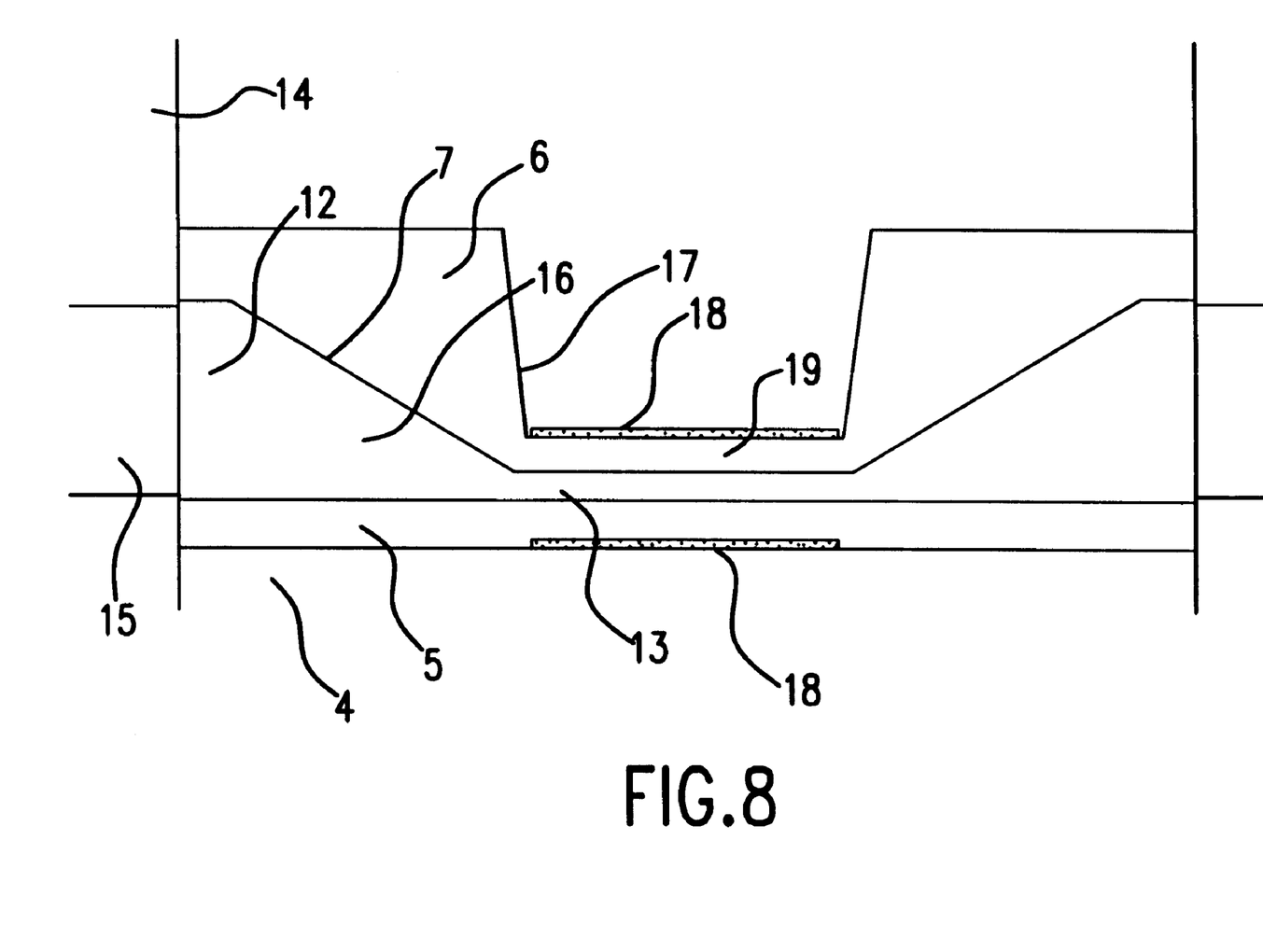
FIG. 8 illustrates a side view of large single mode waveguides which are connected by a waveguide taper to a single mode waveguide of small size position between closely spaced electrodes.

The principle fabrication objective of this vertical taper is a low optical loss transition from a large waveguide 12 to a small waveguide 13 contained between closely space electrodes 18. Such a fabrication is illustrated in FIG. 8. A large single mode waveguide in the NLO polymer is used to match the large mode size 15 of single mode fiber 14 as shown on the left. Coupling losses to single mode fiber are typically much less than 1 dB per end face. The above described vertical taper 7 provides a low loss waveguide transition 16 from the large waveguide 12 to the small waveguide 13. Such a waveguide does not necessarily need to laterally narrow as illustrated by the flattened mode shape shown in FIG. 8. This may or may not be required depending upon device's electrode requirements.

Figure 9:
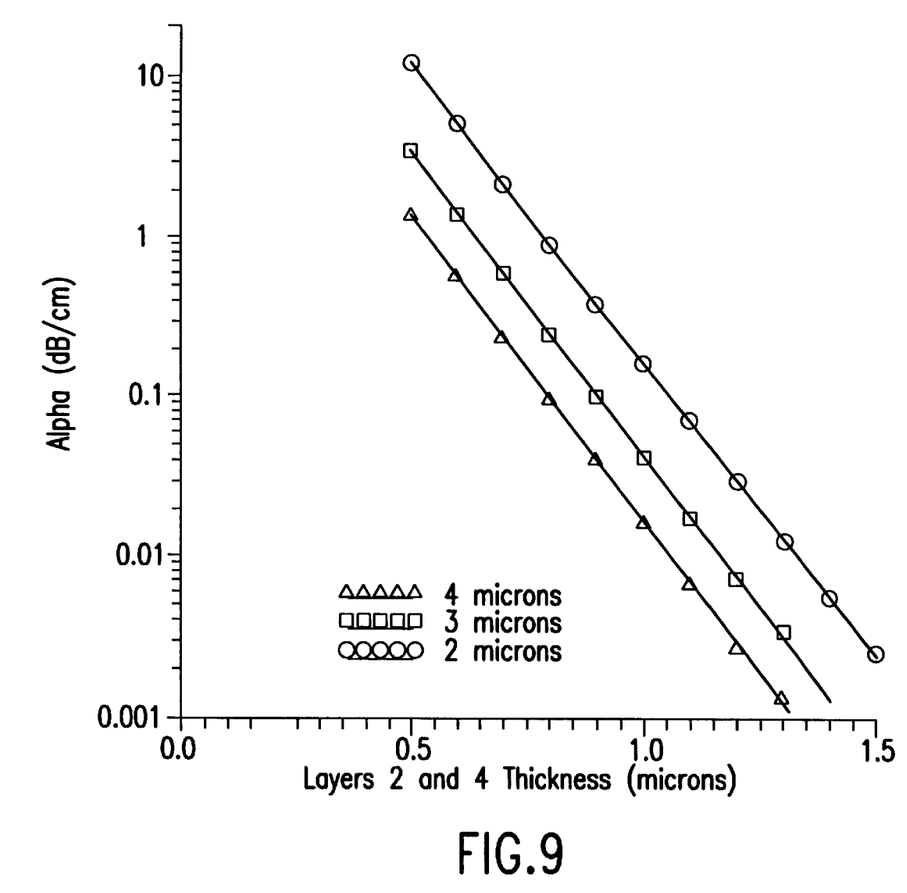
FIG. 9 illustrates the calculated optical losses due to electrode absorption for different channel thicknesses as a function of cladding thicknesses.

Theoretical analyses of dielectric waveguide tapers suggest that virtually loss-less dielectric waveguide tapers can be made following certain optimum profiles. Such a contour is detailed by the calculations published by Sakai and Marcatili, "Lossless Dielectric Tapers with Three-Dimensional Geometry," *J. Lightwave Technol.* 9: 386–393, 1991. The prescribed functional form of this loss-less dielectric taper is $$n(r, \theta, \psi) = n_0 \sqrt{1 + \left(\frac{a\sqrt{2\Delta}}{r}\right)^2 (D_1^2 \pm D_2^2 \sin^2\theta)} \text{ for } \theta_1 \leq \theta \leq \theta_2 \quad (8)$$

where the index n is in spherical coordinates, $n_0$ is the cladding index, $\Delta$ is the relative index difference between core and cladding, and the D parameters relate mode index to angle. The wider the taper width is, the smaller the refractive index difference is in order to maintain a constant mode support along the r axis during propagation in a loss less taper. To simplify illustrations of tapers, the tapers in FIG. 9 have been depicted as linear, but note that the optimum taper profiles have a more complicated nonlinear profile. Allowing for intrinsic polymer optical loss and fabrication imperfections, a loss of <0.5 dB for a taper transition should be feasible through photoprocessing and the use of these optimum transition profiles.

EXAMPLE 3

The ability to achieve a low loss transition to small device dimensions as illustrated in the previous example shows that EO drive voltages can be significantly reduced through this fabrication approach. The large vertical $\Delta n$ gradients created by the shorter wavelength photoprocessing serve effectively as cladding layers. The principal source of optical loss with closely spaced electrodes is usually the direct absorption of evanescent guided light in the cladding by the electrodes. Control of this large $\Delta n$ gradient can be used to minimize the cladding thickness as well as the mode size in the waveguiding region.

The optical loss, $\alpha$, due to electrode absorption can be expressed according to the results published by Reisinger in "Characteristics of Optical Guided Modes in Lossy Waveguides," *Appl. Opt.* 12: 1015–1025, 1973, and by Kaminow et. al. in "Metal-clad Optical Waveguides: Analytical and Experimental Study," *Appl. Opt.* 13: 396–405, 1974:

$$\alpha = \frac{-\ln(T)}{2L_3 \tan\theta_3} \quad (9)$$

where the waveguide transmission T is $$T = \Gamma_1 \Gamma_2 e^{-2\gamma_{3x}l_3} \quad (10)$$

and $L_3$ is the thickness of the guiding layer, $\theta_3$ is the mode angle, $\Gamma_1$ are the complex reflection coefficients, and $\gamma_{3x}$ is the component of the complex wavenumber normal to the film surface. By solving for the complex propagation constant for the guided mode in this multi layer dielectric with complex indices (indices are complex for the metal electrodes), the imaginary part of the propagation constant can be determined. This approach is based upon published models for absorption loss in lossy dielectrics and has been previously tested with numerous experimental measurements of both slab and channel waveguide loss measurements of NLO polymers having varying thicknesses of cladding and metallization as published by Mustacich et al. in "Analysis and fabrication of overlapping-electrode designs for poling and modulating channels in polymer thin films," *Appl. Opt.* 31: 2800–2806, 1992. Example calculation are shown in FIG. 9 for the DR19 polymer films of different thickness (2–4 µm) cladded symmetrically with different thickness claddings (horizontal axis) and coated with aluminum. Cladding thicknesses of approximately 1 µm are shown to contribute minimally to the optical propagation loss, even for very small waveguide dimensions of 2 µm.

These calculations and photoprocessing results suggest that an approach such as dielectric etching can be used to remove excess cladding above the small waveguide between the tapers to a create a trench 17 for the electrode as shown in FIG. 8. Deposition of a metal electrode 18 above this etched region then provides a narrow electrode spacing. A sufficient thickness of NLO polymer which has been photoprocessed into low index cladding 19 remains above the waveguide so that absorption losses are minimized according to the calculations illustrated in FIG. 9. This fabrication approach requires few steps and can provide high optical quality (low loss) waveguides with low cost fabrication.

In the case of fibers and opto-electronic components pre-positioned on a substrate for integration, this processing can be applied after the positioning of these components. Thus, the multicolor lithography can be adaptively applied to define buried channel waveguides of different sizes and interconnecting waveguide tapers which can be aligned to the pre-positioned components. This approach can provide low loss optical waveguide for complex opto-electronic hybrid circuits.

What is claimed is:

1. A method of optically fabricating waveguides including the steps of:

a) depositing a photoreactive polymer film on a cladding layer formed on a substrate;

exposing an upper surface of said photoreactive polymer film to a light beam having a first wavelength selected to be strongly absorbed by said polymer film for photoprocessing said polymer film to form a cladding layer in an upper region of said polymer film having a first index of refraction gradient;

c) positioning a lithographic mask over said upper surface of said polymer film;

d) exposing said upper surface of said polymer film to a light beam having a second wavelength distinct from said light beam first wavelength and less strongly absorbed by said polymer film than said light beam of said first wavelength for forming boundary regions of said polymer film having a second index of refraction gradient, said second index of refraction gradient being less than or equal to said first index of refraction gradient, said boundary regions defining an optical channel therebetween, said light beam first wavelength being less than said light beam second wavelength; and, e) forming a trench between said boundary regions of said photoreactive polymer film.

2. The method as recited in claim 1 where the step of forming said trench is followed by the step of mounting a pair of electrodes on opposing sides of said optical channel.

* * * * *